United States Patent
Dornieden et al.

[11] Patent Number: 6,151,773
[45] Date of Patent: Nov. 28, 2000

[54] ASSEMBLY MACHINE WITH AT LEAST ONE WORK STATION

[75] Inventors: Georg Dornieden, Burgwalde; Carsten Tischendorf, Heiligenstadt, both of Germany

[73] Assignee: Sim Zufuhr- und Montagetechnik GmbH & Co. KG, Heiligenstadt, Germany

[21] Appl. No.: 09/022,143

[22] Filed: Feb. 11, 1998

[51] Int. Cl.[7] ...................................................... B23P 21/00
[52] U.S. Cl. ................................ 29/771; 29/701; 29/739; 29/760
[58] Field of Search ............................. 29/771, 701, 709, 29/739, 760

[56] References Cited

U.S. PATENT DOCUMENTS 3,895,478  7/1975  Freiendship .................................. 53/77

FOREIGN PATENT DOCUMENTS 43 20 501   12/1994  Germany .
43 28 988   3/1995   Germany .
4340676A1   6/1995   Germany .

Primary Examiner—P. W. Echols
Assistant Examiner—John C. Hong
Attorney, Agent, or Firm—Herbert Dubno, Andrew Wilford

[57] ABSTRACT

An assembly machine has a frame defining at least one work station, a transfer mechanism for feeding a succession of workpieces one at a time through the station, and at least one tool at the station movable between an operative position engageable with the workpiece in the station and a retracted position out of engagement with the workpiece in the station. A push-pull operating element has an outer end connected to the tool and an inner end connected to a cam carried on an output of a drive mounted on the frame for displacing the tool between its positions synchronously with feeding of the workpieces through the station. A pneumatic spring mounted on the frame is braced against the tool and has a compartment pressurizable to urge the tool into the operative position. The back compartment is continuously pressurized with a gas under a generally constant pressure.

6 Claims, 7 Drawing Sheets

ASSEMBLY MACHINE WITH AT LEAST ONE WORK STATION

FIELD OF THE INVENTION

The present invention relates to an assembly machine with at least one work station. More particularly this invention concerns such a machine to which a succession of workpieces are fed for assembly or some other operation.

BACKGROUND OF THE INVENTION

A standard assembly machine, for instance serving to put together small- to medium-sized articles such as hinges or lamp sockets, sits adjacent a conveyor or transfer machine that brings to it a succession of partially constructed and/or assembled workpieces that the assembly machine must perform some operation on. Normally the assembly machine is provided with one or more grippers and/or with a tool that performs some desired operation on the workpiece, often adding to the workpiece a part that is fed in by another conveyor.

Invariably such an assembler has at least one actuator that can move in a straight line. Normally two are provided, one to move in a holder and get a grip on the workpiece and another that carries a tool that operates on the workpiece and/or a part to be added to the workpiece. In the standard systems described in German patent 4,320,501 of G. Dornieden each workpiece is carried on a respective holder that is moved along by a special-duty conveyor through a plurality of work stations to some of which are delivered parts that are added to the workpiece. Immediately downstream of the furthest downstream work station is an emptying station that either strips each workpiece off its holder so that the holder can be recirculated to a point upstream of the furthest upstream work station and fitted with a new unfinished workpiece or that actually moves each holder and its workpiece along to another machine or set of machines. The conveyor is a worm extending the full length of the production line from the furthest upstream station to the furthest downstream station and formed with a continuous screwthread having pitched sections extending helically of the worm's axis alternating with unpitched sections lying in respective planes perpendicular to this axis. Each holder has formations complementarily engaged with this screwthread so that as the worm rotates the holders are advanced in steps, moving axially downstream when their formations engage the pitched screwthread sections and stationary while engaging the unpitched sections.

In German patent 4,328,988 of G. Dornieden and C. Tischendorf another system is described where the workpieces are moved, with or without holders, in a horizontal orbit about a vertical axis. To this end they are held in respective seats spaced angularly apart around a ring on the edge of a circular transfer plate that itself is driven step-wise. The drive for the transfer plate is mechanically synchronously coupled to a shaft carrying a stack of different cams each associated with a respective push-pull-actuator, e.g. a bowden cable, whose other end is coupled to a slide, gripper, or other device at a work station so that everything is done synchronously.

Normally as mentioned the movable elements, termed tools hereinafter, at the work stations that grip, machine, install parts on, and otherwise operate on the workpiece are moved between a working position in the station to a retracted position out of the way of the workpieces as they are stepped from station to station. In the rest position the tools are typically biased against the workpiece by a spring that, for instance, presses a rotating drill bit or screw into the workpiece, pushes a press-fit part into a seat on the workpiece, or somehow deforms the workpiece. The force of the spring must be set before each production run in accordance with the operation performed and the type of workpiece. Since the typical spring characteristic, that is spring force plotted against compression or extension, is not a straight line, it is not only necessary to reset the precompression of the spring during each changeover, but also often to replace the spring altogether with another having a different characteristic when the existing spring cannot be set to the needed force. Obviously this operation substantially increases the down time during changeover from one production run to another.

OBJECTS OF THE INVENTION

It is therefore an object of the present invention to provide an improved assembly machine.

Another object is the provision of such an improved assembly machine which overcomes the above-given disadvantages, that is which can be changed over easily.

SUMMARY OF THE INVENTION

An assembly machine has according to the invention a frame defining at least one work station, a transfer mechanism for feeding a succession of workpieces one at a time through the station, and at least one tool at the station movable between an operative position engageable with the workpiece in the station and a retracted position out of engagement with the workpiece in the station. A push-pull operating element has an outer end connected to the tool and an inner end connected to a cam carried on an output of a drive mounted on the frame for displacing the tool between its positions synchronously with feeding of the workpieces through the station. According to the invention a pneumatic spring mounted on the frame is braced against the tool and has a compartment pressurizable to urge the tool into the operative position. The back compartment is continuously pressurized with a gas under a generally constant pressure.

With this system it is therefore a very simple matter to change the biasing pressure of the spring. All that needs to be done is change the pressure in the closed pneumatic system, normally including a pressure accumulator. This can be done easily, typically by adjusting a pressure-limiting valve. In addition the pneumatic spring, typically formed as a cylinder subdivided by the piston into the back compartment and an opposite front compartment, has a constant spring constant along its entire range of motion, so that the problems of a varying spring constant as with a coil spring are avoided.

According to the invention the drive includes a stepper transmission connected between the motor output and the feed unit. Normally a rotary motor output is connected by a toothed belt or chain to a stepper that itself powers the feed unit.

The means for pressurizing in accordance with the invention is variable to pressurize the back compartment with different generally constant pressures. This makes changeover between different production runs relatively easy. In addition the machine further has according to the invention a feed line connected to the front compartment of the pneumatic spring, a pressure source containing a gas under a pressure substantially higher than the generally constant pressure, and a valve in the line openable for pressurizing the front compartment with the higher pressure and thereby pulling the tool into the retracted position. This makes it extremely easy to retract all the tools if necessary, since typically the frame has a plurality of work stations each provided with a respective tool.

The feed means according to another feature of this invention includes a horizontal transfer plate rotatable on the frame about an upright axis and having a periphery formed with a plurality of angularly spaced workpiece seats. The frame includes a smaller diameter frame plate juxtaposed with the transfer plate and defining a plurality of angularly spaced such work stations. The operating element extends through the plates and the drive has a stepper transmission connected between the output and the transfer plate.

Alternately in accordance with the invention the feeder includes a horizontal worm extending along and rotatable about a horizontal axis and formed with a screwthread having pitched sections and unpitched sections, a plurality of workpiece holders spaced along the worm and each having a formation complementarily engaging the screwthread, and a connection to the common drive for continuously rotating the worm and thereby advancing the holders axially when same engage the pitched sections and for maintaining them stationary in respective such work stations when they engage the unpitched sections. Such a system can further be equipped with units for separating the workpieces from the holders at a downstream end of the worm, for recirculating the holders to an upstream end of the worm, and for fitting each holder with a respective workpiece at the upstream end of the worm.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
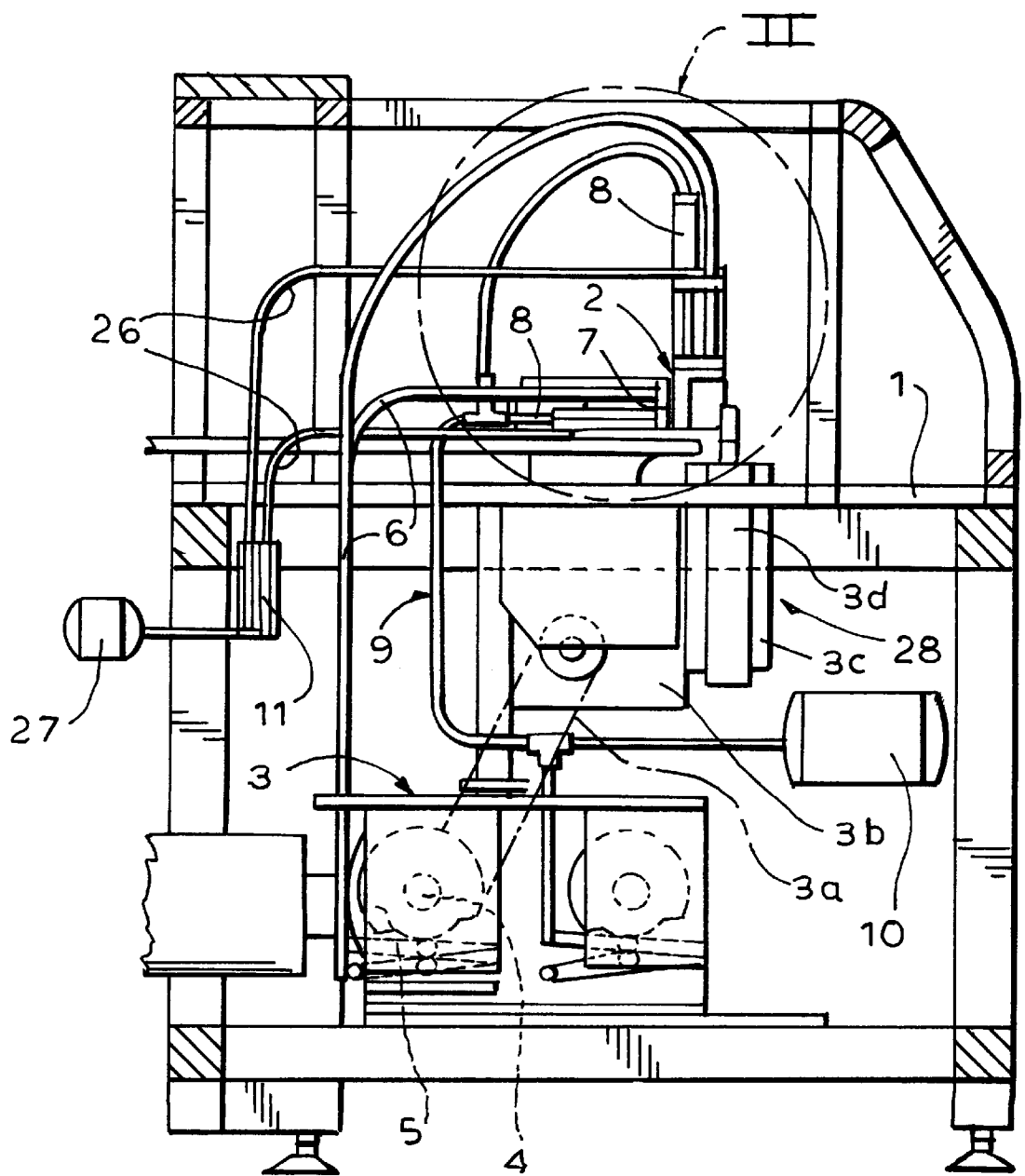
FIG. 1 is a vertical section through the machine according to the invention.
Figure 2:
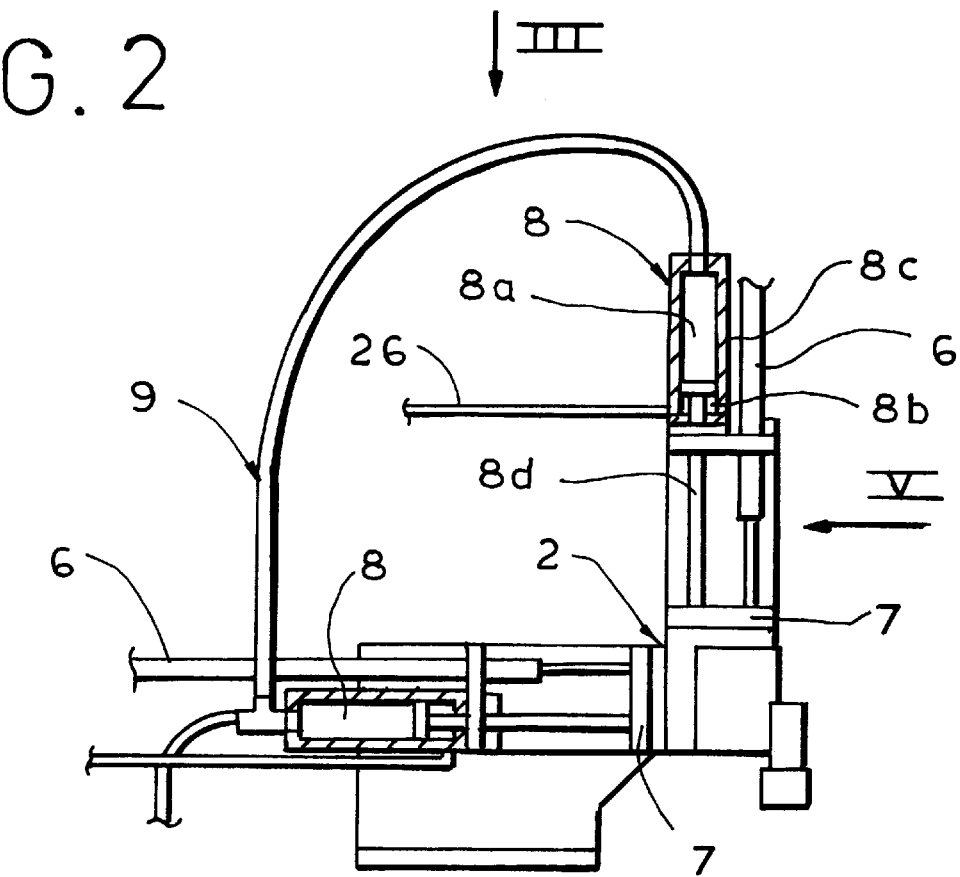
FIG. 2 is a larger-scale view of the detail indicated at II in FIG. 1.
Figure 3:
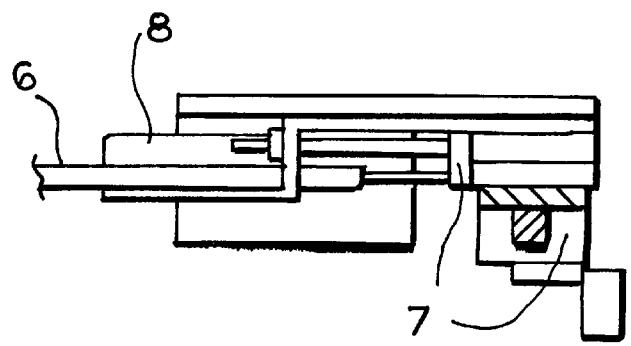
FIG. 3 is a partly sectional top view taken in the direction of arrow III of FIG. 2.
Figure 4:
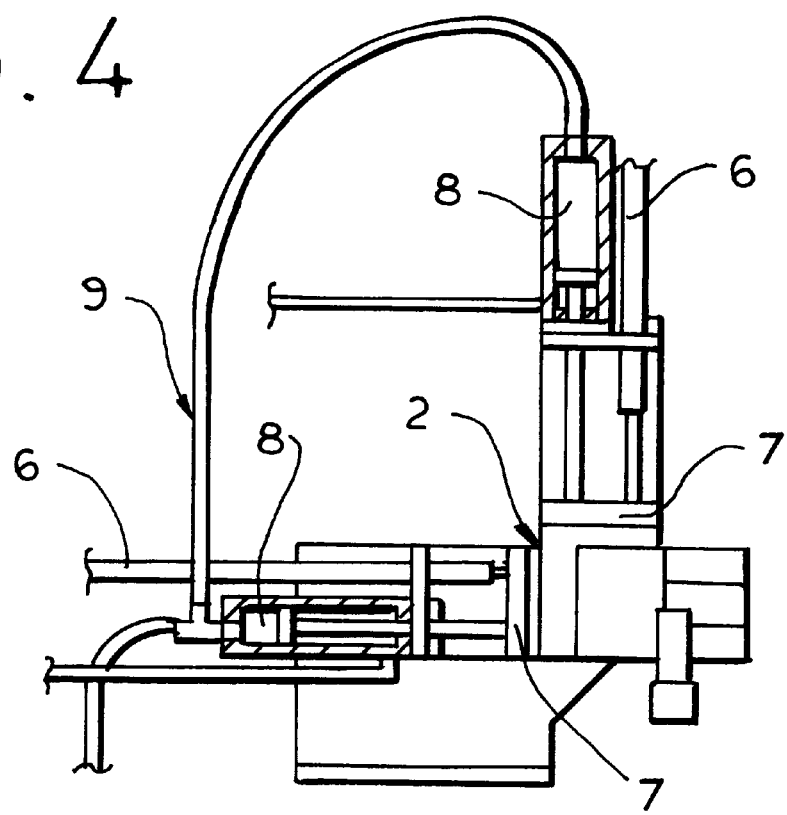
FIG. 4 is a view like FIG. 2 but in another position.
Figure 5:
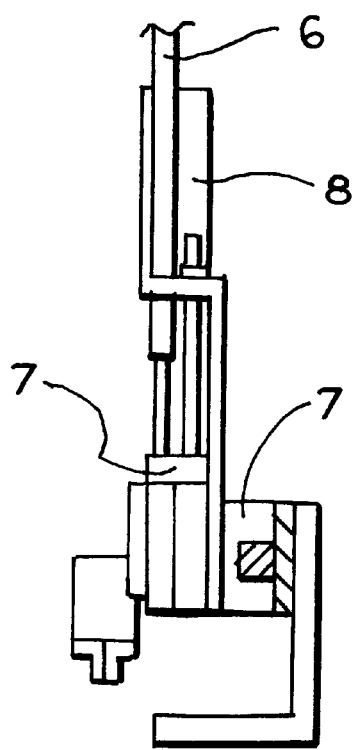
FIG. 5 is a side view taken in the direction of arrow V of FIG. 2.
Figure 6:
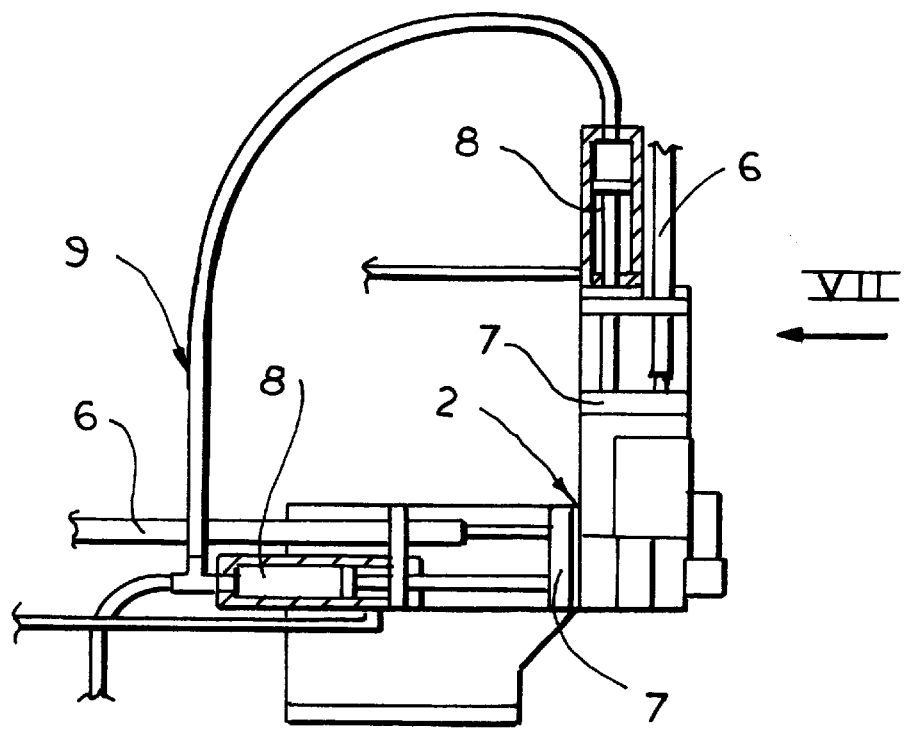
FIG. 6 is a view like FIG. 2 but in yet another position.
Figure 7:
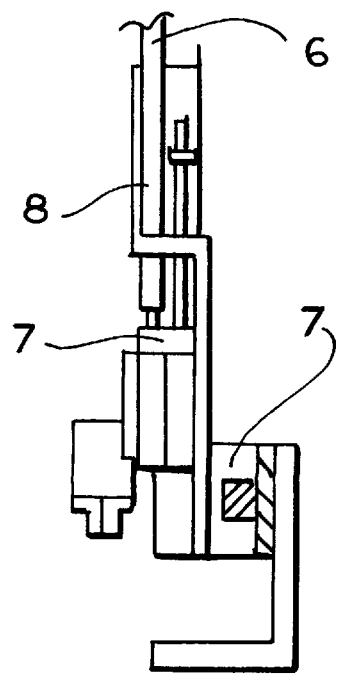
FIG. 7 is a side view taken in the direction of arrow VII of FIG. 6.

As seen in FIGS. 1 through 7 an assembly machine has a basically stationary frame or housing 1 forming a work station 2 to which are fed workpieces by a transfer mechanism 28 that has several workpiece seats. The transfer mechanism 28 and movable tools 7 at the working station 2 are powered by a common drive 3 constituted as a motor/transmission assembly having a toothed belt 3a connected via a stepper 3b to a drum 3c driving a belt 3d of the transfer mechanism 28. The drive 3 also has an output shaft 4 carrying a plurality of cams 5 that operate respective push-pull coupling elements 6, here bowden cables, in turn connected to the respective mechanical operating elements, here tools 7 formed as slides. The primary function of the cams 5 and elements 6 is to move the tools or slides 7 between advanced positions engageable with or operating on the workpiece in the station 2 and retracted positions allowing the finished workpiece to be moved on a fresh workpiece to be moved into position.

Each such slide 7 is associated with a respective pneumatic spring 8 having a back compartment 8a, a front compartment 8b, a piston 8c, and a piston rod 8d connected to the respective slide 7. Each back compartment 8a is connected to a common closed pneumatic system 9 having a pressure accumulator 10 that maintains a relatively low biasing pressure P1 in this system 9 and in the back compartments 8a. Thus the slides 7 are urged toward the work station 2 to hold and act on the workpiece therein. The pressure P1 is adjustable depending on activity and type of workpiece.

In addition as shown in FIG. 1 the front compartments 8b are connected via lines 26 to respective solenoid valves 11 and therethrough to another pressure source 27 that is pressurized at a pressure P2 substantially higher than the pressure P1. Thus when the valves 11 are open, the pistons 8c are retracted against the pressure P1, allowing free access to the stations 2 and removal of a finished workpiece and installation of a workpiece to be assembled or machined.

Figure 8:
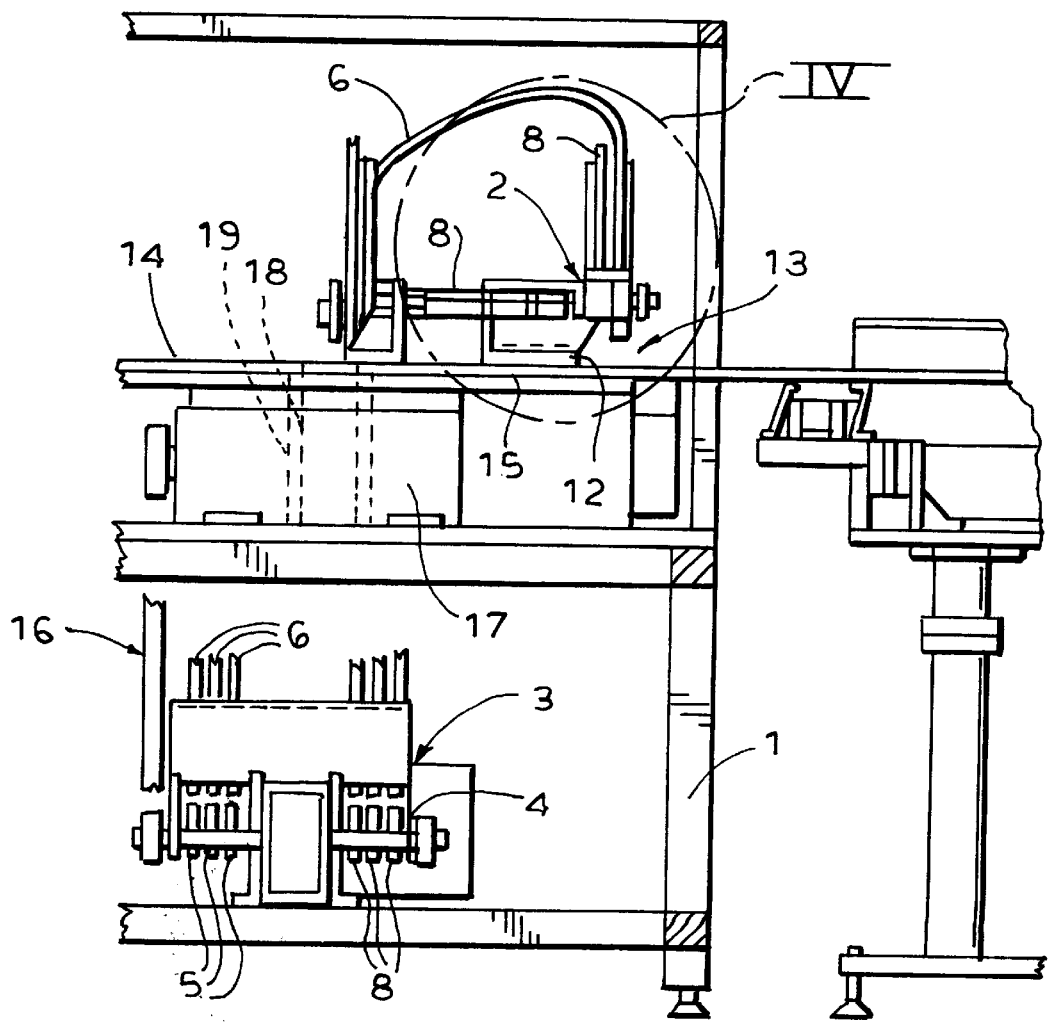
FIG. 8 is a view like FIG. 1 of another machine according to the invention.
Figure 9:
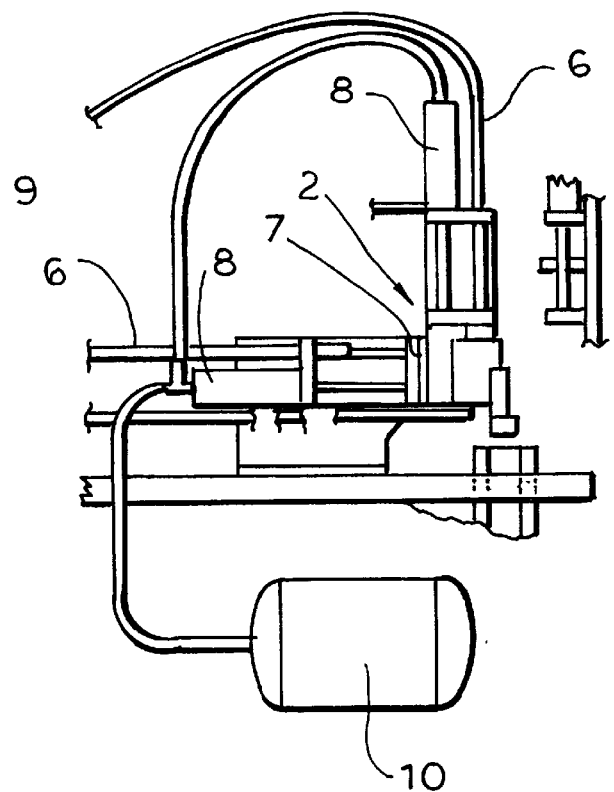
FIG. 9 is a larger-scale view of the detail indicated at IX in FIG. 8.

FIGS. 8 and 9 show the instant invention adapted to a system like that of above-cited German 4,328,988 having a so-called circular feeder. Here an outside ring rotor 12 forms the transfer mechanism and has workpiece seats 13 equispaced around its periphery. The machine frame 1 is provided with a fixed circular plate 14 that carries the equipment and forms a plurality of work stations 2. In addition the transfer mechanism has on the plate 14 a seat plate 15 that is concentric to it, driven in rotary steps, and of a radius greater than that of the plate 14 so that it forms the rotor 12. The drive of the feed rotor 12 as well as of the working station is effected by the drive 3 that operates continuously and is located underneath the plate 15. This drive 3 is effective via a toothed belt 16 and a stepper 17 on the plate 15 and via the shaft 4 with cams 5 connected via elements 6 to the individual working stations 2. These elements 6 pass through a central hole in the plate 15 and are connected to the stepper 17 of the working station 2. A central tubular column 18 supports the fixed plate 14 and is surrounded by a rotary tube shaft 19 for the plate 15. As in FIGS. 1 to 3, pneumatic springs 8 are provided.

Figure 10:
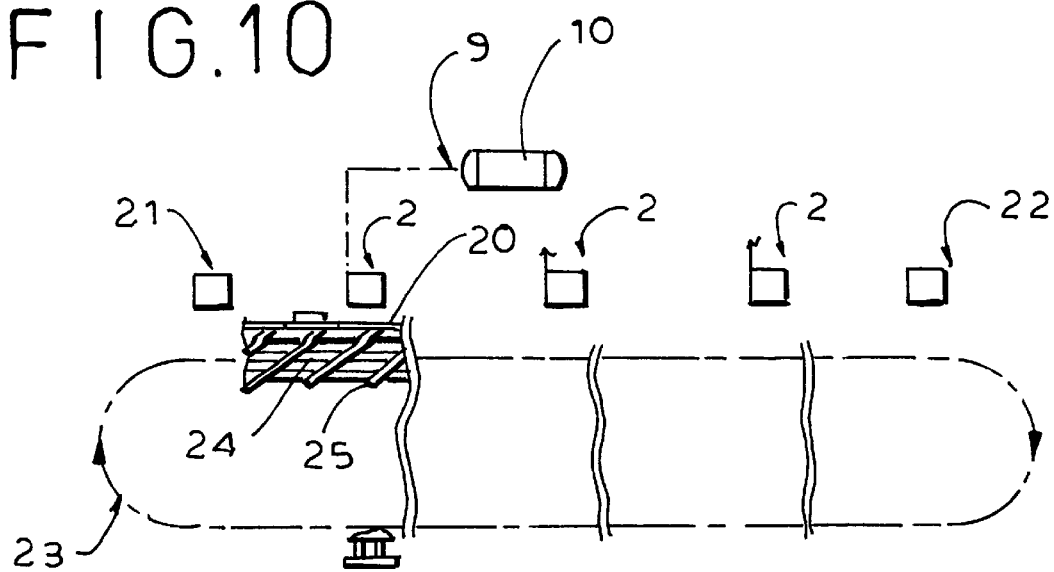
FIG. 10 is a small-scale largely schematic view of yet another system in accordance with the invention.
Figure 11:
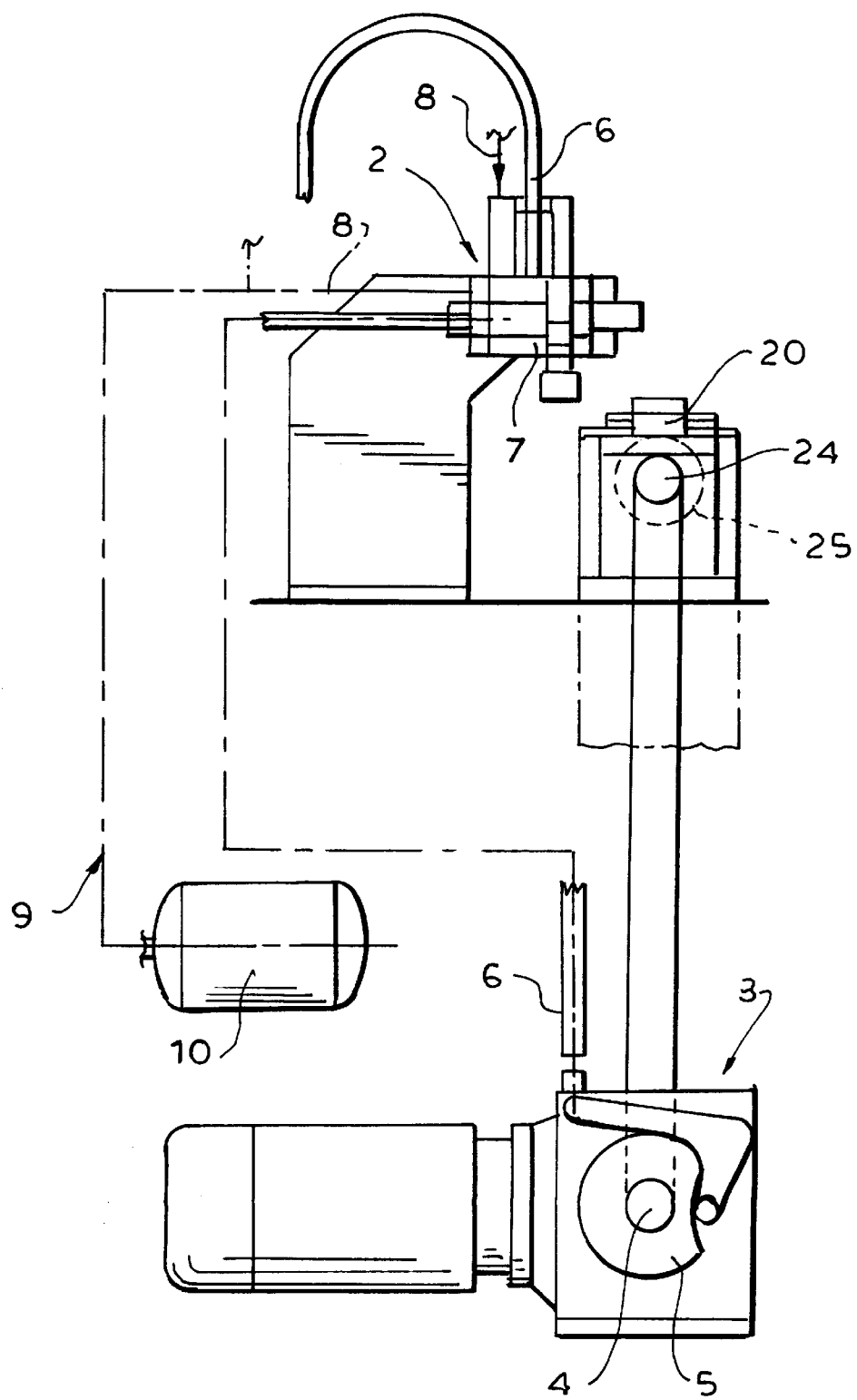
FIG. 11 is a cross section through the machine of FIG. 10.

FIGS. 10 and 11 show a system as in German 4,320,501 for machining and/or assembling workpieces in holders 20 that has a working station 2 as well as a feed station for the workpiece holders 20. In addition there is an unloading device 22 for the holders 20 and a return conveyor 23 for these holders 20. The transfer mechanism has a drive shaft 24 with a screwthread drive formation 25 engaging appropriate formations on the holders 20. To this end the formation 25 has transport sections with pitched regions and unpitched positioning and rest regions. In addition the device has pneumatic springs 8.

We claim:

1. An assembly machine comprising:

a frame defining a plurality of work stations;

means for feeding a succession of workpieces one at a time through the stations;

a tool at each of the stations movable between an operative position engageable with the workpiece in the respective station and a retracted position out of engagement with the workpiece in the respective station;

respective push-pull operating elements each having an outer end connected to a respective one of the tools and an inner end;

drive means mounted on the frame, having an output connected to the feed means, and having a plurality of respective cams each connected to the inner end of a respective one of the operating elements for displacing the respective tools between their positions synchronously with feeding of the workpieces through the respective stations;

a respective pneumatic spring braced against each of the tool and having a back compartment pressurizable to urge the respective tool into the operative position and an opposite front compartment;

means for pressurizing the back compartment with a gas under a generally constant pressure;

respective feed lines connected to the front compartments;

a pressure source connected to all of the feed lines and containing a gas under a pressure substantially higher than the generally constant pressure; and respective valves in the lines openable for pressurizing the front compartments with the higher pressure and thereby pulling the respective tools into the retracted positions.

2. The assembly machine defined in claim 1 wherein the drive means includes a stepper transmission connected between the motor output and the feed means.

3. The assembly machine defined in claim 1 wherein the means for pressurizing continuously pressurizes the back compartments with respective different generally constant pressures.

4. The assembly machine defined in claim 1 wherein the feed means includes a horizontal transfer plate rotatable on the frame about an upright axis and having a periphery formed with a plurality of angularly spaced workpiece seats, the frame including a smaller diameter frame plate juxtaposed with the transfer plate and defining a plurality of angularly spaced such work stations, the operating element extending through the plates, the drive means having a stepper transmission connected between the output and the transfer plate.

5. The assembly machine defined in claim 1 wherein the feed means includes a horizontal worm extending along and rotatable about a horizontal axis and formed with a screwthread having pitched sections and unpitched sections, a plurality of workpiece holders spaced along the worm and each having a formation complementarily engaging the screw-thread, and means for continuously rotating the worm and thereby advancing the holders axially when same engage the pitched sections and for maintaining them stationary in respective such work stations when they engage the unpitched sections.

6. The assembly machine defined in claim 5, further comprising means for separating the workpieces from the holders at a downstream end of the worm, for recirculating the holders to an upstream end of the worm, and for fitting each holder with a respective workpiece at the upstream end of the worm.

* * * * *